United States Patent
Chen et al.

[11] Patent Number: 5,866,227
[45] Date of Patent: Feb. 2, 1999

[54] MAGNETIC RECORDING MEDIUM WITH PARTIALLY OXIDIZED SEED LAYER

[75] Inventors: Qixu Chen, Milpitas; Ga-Lane Chen, Fremont, both of Calif.

[73] Assignee: Seagate Technology, Inc., Scotts Valley, Calif.

[21] Appl. No.: 699,759

[22] Filed: Aug. 20, 1996

[51] Int. Cl.$^6$ ........................................... G11B 5/66
[52] U.S. Cl. .................. 428/65.3; 428/65.4; 428/65.5; 428/336; 428/694 T; 428/694 TS; 428/694 TP; 428/900; 427/128; 427/130; 427/131; 204/192.2
[58] Field of Search .................. 428/336, 694 T, 428/694 TP, 694 TS, 65.3, 900, 65.4, 65.5; 427/129, 130, 131; 204/192.2

[56] References Cited

U.S. PATENT DOCUMENTS

| | | | |
|---|---|---|---|
| 4,900,397 | 2/1990 | Werner | 216/22 |
| 5,273,834 | 12/1993 | Hoover | 428/694 ST |
| 5,302,434 | 4/1994 | Doerner | 428/65.6 |

OTHER PUBLICATIONS

Futamoto et al., Magnetic and Recording Characteristics of Bicrystalline Longitudinal Recording Medium Formed on an MgO Single Crystal Disk Substrate, IEEE Trans. Magn., vol. 30, No. 6, 1994, pp. 3975–3977.

Wong et al., "Investigation of CoNiCr Thin Films Deposited on [100] and [110] Cr Single Crystals," IEEE Trans. Magn. vol. 27, No. 6, Nov. 1991, pp. 4733–4735.

Mirzamaani et al., "Magnetic properties of CoPtCr thin films with <1120> crystal orientation," J. Appl. Phys. 69(8), Apr. 15, 1991, pp. 5169–5171.

Min et al., "Bicrystal advanced thin–film media for high density recording," J. Appl. Phys. 75(10), May 15, 1994, pp. 6129–6131.

Ding et al., "Microstructure and Recording Properties of Bicrystal Disks with GaAs Substrates," IEEE Trans. Magn. vol. 30, No. 6, Nov. 1994, pp. 3978–3980.

Futamoto et al., "Magnetic and Recording Characteristics of Bicrystalline Longitudinal Recording Medium Formed on an MgO Single Crystal Disk Substrate," IEEE Trans. Magn., vol. 30, No. 6, 1994, pp. 3975–3977.

Ye et al., "Modeling of thin–film media with advanced microstructure for ultrahigh density recording," J. Appl. Phys. 75(10), May 15, 1994, pp. 6135–6137.

Nolan et al., "Effect of microstructural features on media noise in longitudinal recording media," J. Appl. Phys. 73(10), May 15, 1993, pp. 5566–5568.

Peng et al., "Micromagnetic and Experimental Studies of CoPtCr Bicrystal Thin Film Media," (JA–01), Intermag Conference, San Antonio, Texas, Apr. 1995).

Hosoe et al., "Bicrystal Cluster Structure and Magnetic Properties of CoCrTa/Cr Thin Film Media," (JA–02, Intermag Conference, San Antonio, Texas, Apr. 1995).

Ding et al., "Fabrication and Recording Performances of Bicrystal Disks on GaAs Substrates," Journal of The Magnetics Society of Japan, vol. 18, Supplement, No. S1 (1994).

Ding et al., "Experimental Study on Recording and Track Edge Characteristics of Bicrystal Thin Film Media," IEEE Trans. Magn., vol. 31, pp. 2827, 1995.

Primary Examiner—Leszek Kiliman
Attorney, Agent, or Firm—McDermott, Will & Emery

[57] ABSTRACT

A magnetic recording medium comprising a glass or glass-ceramic substrate is formed by sequentially depositing thereon a partially oxidized NiP seed layer, an underlayer and a magnetic layer. The partially oxidized NiP seed layer is formed by reactive sputtering in a gas mixture of argon and oxygen. The resulting magnetic recording medium exhibits low medium noise and high coercivity rendering it suitable for high density magnetic recording.

36 Claims, 2 Drawing Sheets

MAGNETIC RECORDING MEDIUM WITH PARTIALLY OXIDIZED SEED LAYER

TECHNICAL FIELD

The present invention relates to a magnetic recording medium, such as a thin film magnetic recording disk, and to a method of manufacturing the medium. The invention has particular applicability to a magnetic recording medium exhibiting low noise, high coercivity and high recording density.

BACKGROUND ART

The requirements for high areal recording density impose increasingly greater requirements on thin film magnetic recording media in terms of coercivity, remanent squareness, low medium noise and narrow track recording performance. It is extremely difficult to produce a magnetic recording medium satisfying such demanding requirements, particularly a high density magnetic rigid disk medium for longitudinal recording.

The linear recording density can be increased by increasing the coercivity of the magnetic recording medium. However, this objective can only be accomplished by decreasing the medium noise, as by maintaining very fine magnetically noncoupled grains. Medium noise is a dominant factor restricting increased recording density of high density magnetic hard disk drives. Medium noise in thin films is attributed primarily to inhomogeneous grain size and intergranular exchange coupling. Therefore, in order to increase linear density, medium noise must be minimized by suitable microstructure control.

A conventional longitudinal recording disk medium is depicted in FIG. 1 and typically comprises a non-magnetic substrate 10 having sequentially deposited thereon a plating 11, such as a plating of amorphous nickel-phosphorous (NiP), and underlayer 12, such as chromium (Cr) or a Cr-alloy, a magnetic layer 13, typically comprising a cobalt (Co)-based alloy, and a protective overcoat 14, typically containing carbon. Conventional practices also comprise bonding a lubricant topcoat (not shown) to the protective overcoat. Underlayer 12, magnetic layer 13 and protective overcoat 14 are typically deposited by sputtering techniques. The Co-base alloy magnetic layer deposited by conventional techniques normally comprises polycrystallites epitaxially grown on the polycrystal Cr or Cr-alloy underlayer.

A substrate material conventionally employed in producing magnetic recording rigid disks comprises an aluminum-magnesium (Al—Mg) alloy. Such Al—Mg alloys are typically electrolessly plated with a layer of NiP at a thickness of about 15 microns to increase the hardness of the substrates, thereby providing a suitable surface for polishing to provide the requisite surface roughness or texture.

Werner et al., U.S. Pat. No. 4,900,397, proposed the use of Radio Frequency (RF) sputter etching to remove surface deposits on a conventional NiP coating of Al-alloy substrates, followed by oxidization, to improve adhesion of a Cr underlayer. Doerner et al., U.S. Pat. No. 5,302,434, found it difficult to obtain high coercivity on superpolished untextured NiP coated substrates, and proposed annealing in air to form a nickel oxide film on the surface of the NiP coating for enhanced coercivity. The smooth surface of the polished NiP layer was maintained through subsequent layers. The nickel oxide film was also said to reduce modulation by altering the crystallographic orientation of the underlayer and magnetic layer.

Other substrate materials have been employed, such as glasses, e.g., an amorphous glass, and glass-ceramic materials which comprise a mixture of amorphous and crystalline materials. Glass-ceramic materials do not normally exhibit a crystalline surface. Glasses and glass-ceramics generally exhibit high resistance to shocks. The use of glass-based materials, such as glass-ceramic materials, is disclosed by Hoover et al., U.S. Pat. No. 5,273,834.

Conventional methods for manufacturing a magnetic recording medium with a glass or glass-ceramic substrate comprise applying a seed layer between the substrate and underlayer. Such magnetic recording media with glass or glass-ceramic substrates are commercially available from different manufacturers with different seed layer materials to reduce the effect of high thermal emissivity of such glass and glass-ceramic substrates, and to influence the crystallographic orientation of subsequently deposited underlayers and magnetic layers. Such conventional seed layer materials also include NiP which is typically sputter deposited on the surface of the glass or glass-ceramic substrate at a thickness of about 500 Å. Conventional magnetic recording media comprising a glass or glass-ceramic substrate having NiP sputtered thereon also comprise, sequentially deposited thereon, a Cr or Cr-alloy underlayer at an appropriate thickness, e.g., about 550 Å, a magnetic layer such as Co—Cr-platinum (Pt)-tantalum (Ta) at an appropriate thickness, e.g., about 350 Å, and a protective carbon overcoat at an appropriate thickness, e.g., about 150 Å. Conventional Cr-alloy underlayers comprise vanadium (V) or titanium (Ti). Other conventional magnetic layers are CoCrTa, CoCrPtB, CoCrPt and CoNiCr. The seed layer, underlayer, and magnetic layer are conventionally sequentially sputter deposited on the glass or glass-ceramic substrate in an inert gas atmosphere, such as an atmosphere of pure argon. A conventional protective carbon overcoat is typically deposited in a mixture of argon with nitrogen, hydrogen or ethylene. Conventional lubricant topcoats are typically about 20 Å thick.

Magnetic films exhibiting a bicrystal cluster microstructure are expected to exhibit high coercivity, low noise and high remanent squareness. In co-pending application Ser. No. 08/586,571 filed on Jan. 16, 1996, a magnetic recording medium is disclosed comprising a glass or glass-ceramic substrate and a magnetic layer exhibiting a bicrystal cluster microstructure. The formation of a bicrystal cluster microstructure is induced by oxidizing the surface of a seed layer so that the underlayer subsequently deposited thereon exhibits a (200) crystallographic orientation which, in turn, induces a bicrystal cluster microstructure in a magnetic alloy layer deposited and epitaxially grown on the underlayer.

Co-pending application Ser. No. 08/586,529 filed on Jan. 16, 1996, discloses a method of manufacturing a magnetic recording medium comprising a glass or glass-ceramic substrate and a magnetic layer exhibiting a bicrystal cluster microstructure. The disclosed method comprises sputter depositing an NiP seed layer on a glass or glass-ceramic substrate and subsequently oxidizing the deposited NiP seed layer. The oxidized upper seed layer surface induces the subsequently deposited underlayer to exhibit a (200) crystallographic orientation which, in turn, induces the magnetic alloy layer deposited and epitaxially grown on the underlayer to exhibit a bicrystal cluster microstructure. The magnetic recording media disclosed in co-pending application Ser. Nos. 08/586,571 now pending and 08/586,529 now U.S. Pat. No. 5,733,370 exhibit high coercivity, low magnetic remanence (Mr) x thickness (t) and low noise, thereby rendering them particularly suitable for longitudinal recording. The entire disclosures of co-pending application Ser. Nos. 08/586,571, now pending and 08/586,529, now U.S. Pat. No. 5,733,370, are incorporated by reference herein.

There exists, however, a need to produce a magnetic rigid disk media for longitudinal recording exhibiting low medium noise and high coercivity in an efficient, cost-effective manner with high production throughput.

DISCLOSURE OF THE INVENTION

An object of the present invention is a magnetic recording medium exhibiting low noise and high coercivity.

Another object of the present invention is a method of manufacturing a magnetic recording medium exhibiting low noise and high coercivity.

Additional objects, advantages and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a magnetic recording medium comprising: a substrate comprising a glass or glass-ceramic material; a seed layer on the substrate; an underlayer on the seed layer; and a magnetic layer on the underlayer; wherein the seed layer is partially oxidized substantially throughout.

Another aspect of the present invention is a method of manufacturing a magnetic recording medium, which method comprises: depositing a partially oxidized seed layer on a substrate comprising a glass or glass-ceramic material; depositing an underlayer on the partially oxidized seed layer; and depositing a magnetic layer on the underlayer.

Additional objects and advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

Figure 1:
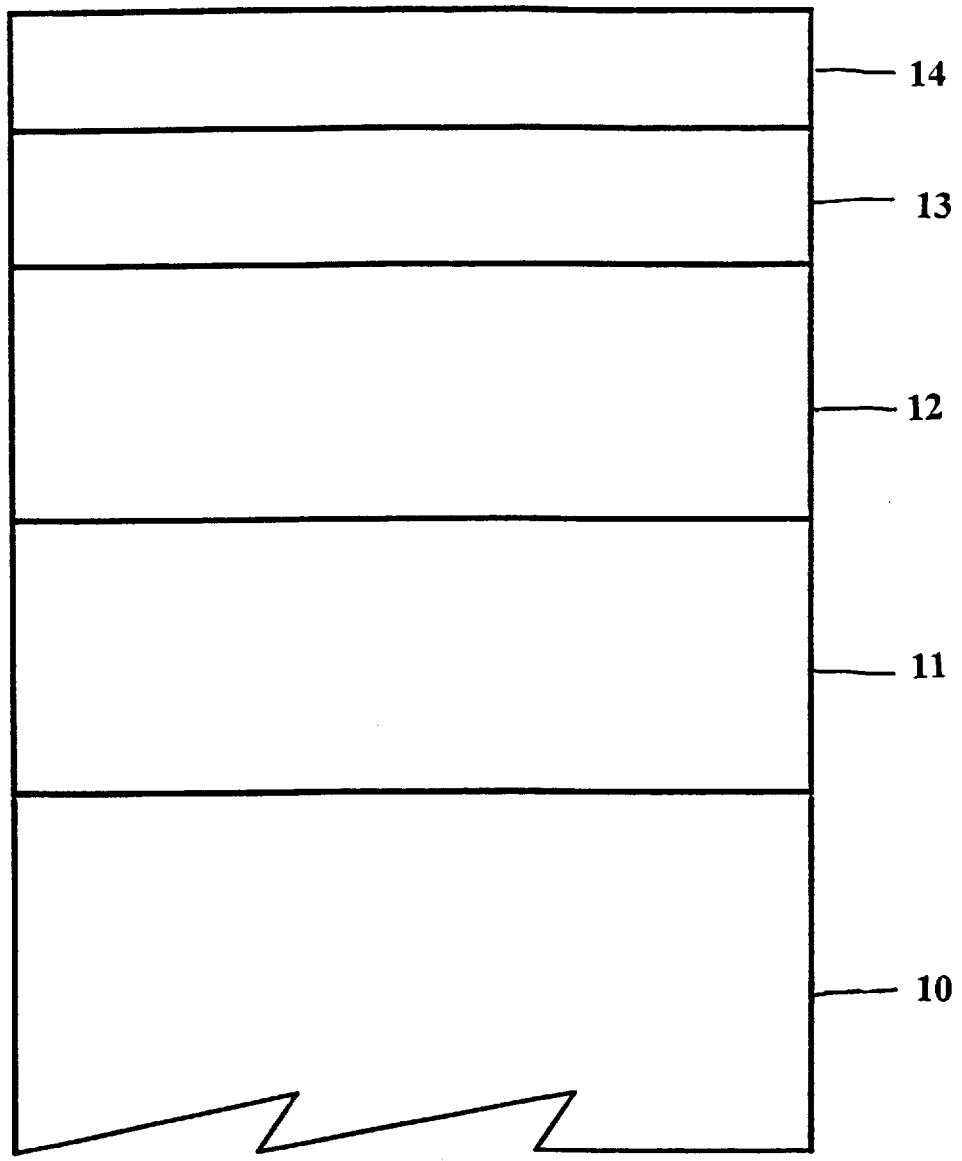
FIG. 1 schematically depicts a conventional magnetic recording medium structure.

The present invention constitutes an improvement over the method disclosed in co-pending application Ser. No. 08/586,529, now U.S. Pat. No. 5,733,370, wherein a seed layer is sputter deposited on a glass or glass-ceramic substrate and subsequently oxidized to control the crystallographic orientation of a subsequently deposited underlayer. The present invention comprises a magnetic recording medium having a glass or glass-ceramic substrate and having sequentially deposited thereon a seed layer, Cr-containing underlayer exhibiting a (200)-dominant crystallographic orientation and magnetic layer exhibiting a ($11\bar{2}0$)-dominant crystallographic orientation. As used throughout this application, the expression "(200)-dominant crystallographic orientation" with respect to a Cr-containing underlayer denotes that the ratio of the number of Cr grains exhibiting a (200) crystallographic orientation to the number of Cr grains exhibiting a (110) crystallographic orientation is greater than 5, as determined by X-ray diffraction curves. The present invention advantageously achieves a ratio of the number of Cr grains exhibiting a (200) crystallographic orientation to the number of Cr grains exhibiting a (110) crystallographic orientation greater than 7. As used throughout this application, the expression "($11\bar{2}0$)-dominant crystallographic orientation" in the context of a Co-alloy magnetic layer denotes that the number of Co-alloy grains exhibiting a ($11\bar{2}0$) crystallographic orientation to the number of Co-alloy grains exhibiting ($10\bar{1}1$) and ($10\bar{1}0$) crystallographic orientations is greater than 5, as determined by X-ray diffraction curves. The present invention also advantageously achieves a ratio of the number of Co-alloy grains exhibiting a ($11\bar{2}0$) crystallographic orientation to the number of Co-alloy grains exhibiting ($10\bar{1}1$) and ($10\bar{1}0$) crystallographic orientations is greater than 7. The present invention further provides an efficient, cost-effective method for manufacturing such a magnetic recording medium, thereby significantly increasing production throughput and reducing equipment cost. The present invention comprises depositing a seed layer which is partially oxidized substantially throughout, thereby obviating a separate surface oxidation step. Thus, the seed layer of the inventive magnetic recording medium is deposited in a partially oxidized state throughout vis-à-vis the separately formed surface oxide layer disclosed in co-pending application Ser. No. 08/586,529, now U.S. Pat. No. 5,733,370.

As employed throughout the present specification and claims, the expression "partially oxidized substantially throughout" is intended to denote that substantially the entire seed layer contains oxides vis-à-vis only the upper surface thereof. Thus, the structure of the seed layer of the present invention differs from that in co-pending applications Ser. Nos. 08/586,571 now pending and 08/586,529, now U.S. Pat. No. 5,733,370, wherein the outer surface of the seed layer is oxidized. The oxidation step is performed subsequent to sputter depositing the seed layer.

In an embodiment of the present invention, a seed layer, such as NiP or Ta, is reactively sputter deposited directly on a glass or glass-ceramic substrate in an atmosphere containing oxygen, such as an atmosphere comprising a gas mixture of an inert gas, e.g., argon, and oxygen. The inventive method comprising depositing a partially oxidized seed layer can easily be integrated into conventional sputter deposition systems for producing magnetic recording media without extensive apparatus modification or increased costs.

The present invention further comprises sequentially depositing an underlayer, magnetic layer, and protective overcoat on the partially oxidized seed layer. The underlayer, magnetic layer and protective overcoat are typically sputter deposited in an inert gas-containing atmosphere, such as argon. When depositing a protective carbon overcoat, the inert gas-containing atmosphere typically comprises argon and ethylene, hydrogen or nitrogen.

Figure 2:
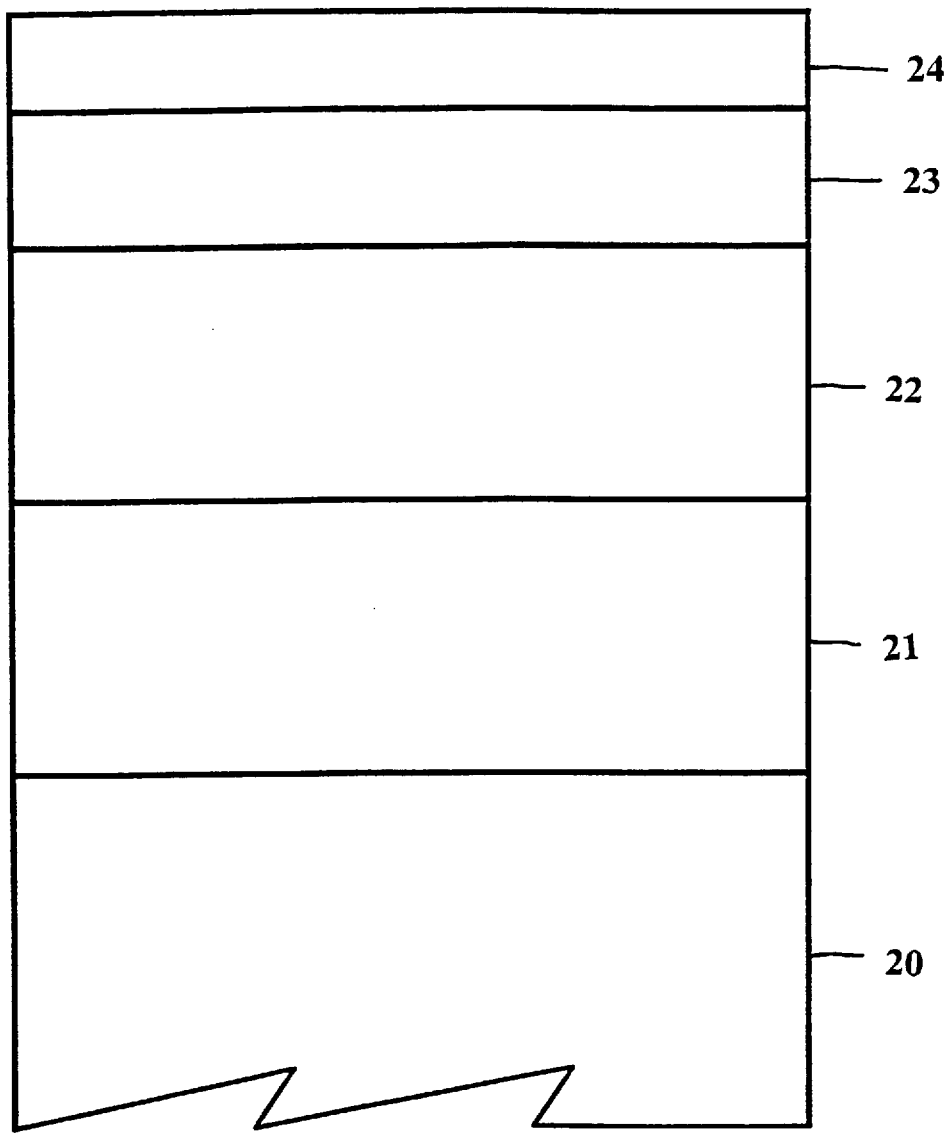
FIG. 2 schematically depicts a magnetic recording medium structure in accordance with the present invention.

Accordingly, the present invention comprises a magnetic recording medium as depicted in FIG. 2, having a glass or glass-ceramic substrate 20, with a partially oxidized seed layer 21, such as NiP, deposited thereon. The inventive magnetic recording medium further comprises a sequentially deposited underlayer 22, magnetic layer 23 and protective overcoat 24. In accordance with the present invention, a lubricant topcoat (not shown) can also be bonded to protective overcoat 24. As in conventional magnetic recording media, the underlayer can comprise Cr or a Cr-alloy, such as an alloy of Cr with V or Ti. However, the seed layer of the present invention is partially oxidized substantially throughout and, hence, advantageously enables the subsequently deposited underlayer having a cubic structure to exhibit a (200)-dominant crystallographic orientation. In conventional magnetic recording media with glass or glass-ceramic substrates, such as that depicted in FIG. 1, the underlayer exhibits a (110) crystallographic orientation. The formation of an underlayer having a (200)-dominant crystallographic orientation, as in the present invention, advantageously enables the epitaxial growth thereon of a magnetic alloy layer exhibiting a (11$\bar{2}$0)-dominant crystallographic orientation. Accordingly, an epitaxially grown Co-base magnetic alloy magnetic layer of the present invention is dominated by a (11$\bar{2}$0) crystallographic orientation; whereas the magnetic alloy layer of the conventional magnetic recording medium with a glass or glass-ceramic substrate depicted in FIG. 1 is dominated by the (10$\bar{1}$0) or (10$\bar{1}$1) crystallographic orientation.

The magnetic recording media of the present invention advantageously exhibit significantly lower medium noise than conventional magnetic recording media with glass or glass-ceramic substrates, such as that illustrated in FIG. 1. The magnetic recording media of the present invention also exhibit a high coercivity even at a low Mrt and, hence, are particularly suitable for high density magnetic recording. Moreover, the inventive method comprising depositing a seed layer which is partially oxidized substantially throughout advantageously reduces dwell time and significantly increases production throughput in a cost-effective, efficient manner.

EXAMPLES

A conventional magnetic recording medium (Sample A) was prepared comprising a glass-ceramic substrate having sequentially sputter deposited thereon a NiP layer, Cr underlayer, CoCrPtTa magnetic alloy layer, and protective carbon overcoat. A second magnetic recording medium representing the present invention (Sample B) was prepared comprising a glass-ceramic substrate having sequentially deposited thereon a NiP layer partially oxidized substantially throughout by reactive sputtering, Cr underlayer, CoCrPtTa magnetic alloy layer, and protective carbon overcoat. A substrate bias was not employed in preparing either Sample A or Sample B. For both Samples A and B, the magnetic alloy contained 15% Cr, 11% Pt, 4% Ta, and the balance Co. The deposition power and film thickness of each of the underlayer, magnetic alloy layer and protective overcoat of each of Sample A and Sample B were identical. The argon pressure during deposition of the Cr underlayer and magnetic alloy layer was 10 mill Torr for both Sample A and Sample B.

The NiP layer of Sample A and the partially oxidized NiP layer of Sample B were deposited at the same power of 3.6 kilo Watts, same pallet speed of 2 fpm (feed per minute) in a pass-by sputtering system, and same gas pressure of 10 mill Torr. The NiP seed layer of Sample A was deposited in argon; whereas, the partially oxidized NiP seed layer of Sample B was deposited in a mixture of argon and 0.5% oxygen by volume. Each of Sample A and Sample B exhibited a similar remanent coercivity (Hcr) of about 2500 Oersteds, and an Mrt of about 1.0 memu/cm$^2$ measured with a remanent moment magnetometer (RMM). The partially oxidized NiP layer of Sample B was analyzed with secondary ion mass spectrometry (SIMS) and found to contain oxides which were primarily PO$_2$ and PO$_3$.

The Cr underlayer of Sample A exhibited a (110) crystallographic orientation; whereas, the Cr underlayer of Sample B exhibited a (200) crystallographic orientation as determined by x-ray diffraction patterns. The recording performances of Sample A and Sample B were evaluated using a Guzik 1601 read-write analyzer (RWA) with a Guzik 1701 spinstand. An inductive head with a write track width of 2.9 $\mu$m and a gap length of 0.5 $\mu$m was employed in the writing process. A magnetoresistive head with a read track width of 2.4 $\mu$m and shield to shield spacing of 0.354 $\mu$m was employed for playback.

The medium transition noise was measured by integrating the noise power spectrum over a bandwidth of 60 MHz and subtracting DC (direct current) noise and the noise from the electronics and spindle.

The magnetic properties measured with RMM and the recording performances of Sample A and Sample B, as well as additional Sample C and Sample B2, were measured at 149.5 thousands of flux reversal per inch (kfci) and are reported in Table 1 below.

TABLE 1

| Samples | SNR (dB) | OW (dB) | PW$_{50}$ (n second) | Hcr (Oersted) | Mrt (memu/cm$^2$) |
|---|---|---|---|---|---|
| B | 8.8 | 35.1 | 25.6 | 2555 | 1.02 |
| B2 | 10.4 | 37.0 | 24.9 | 2535 | 1.02 |
| C | 9.4 | 36.1 | 25.6 | 2555 | 0.96 |
| A | 3.6 | 35.0 | 25.8 | 2510 | 0.99 |

In Table 1 above: SNR denotes the signal-to-medium noise ratio; OW denotes overwrite; and PW$_{50}$ denotes the pulse width at half maximum of the signal output and is expressed in nano seconds. Sample B2 was fabricated under process conditions similar to those employed in preparing Sample B, except that the deposition power and film thickness of the partially oxidized NiP layer of Sample B2 were about half those employed in preparing Sample B. Sample C was prepared under conditions similar to those employed in preparing Sample B. except that the NiP layer of Sample B was initially sputter deposited in argon, and the surface of the sputter deposited NiP layer subsequently oxidized in a mixture of argon and oxygen prior to depositing the Cr underlayer thereon.

It is apparent from the results reported in Table 1, that Sample B of the present invention exhibits an SNR in excess of conventional Sample A, and is competitive with Sample C. Sample B2 exhibits further improvements in terms of SNR, OW and PW$_{50}$ derived from optimizing process variables.

Accordingly, the present invention comprises a magnetic recording medium having a significantly improved SNR by virtue of sputter depositing a seed layer partially oxidized substantially throughout, such as an NiP layer. The subsequently deposited Cr or Cr-alloy underlayer exhibits a (200)-dominated crystallographic orientation which induces a subsequently deposited magnetic layer to exhibit a (11$\bar{2}$0)-dominant crystallographic orientation, with an attendant increase in SNR. The substrates employed in the present invention can advantageously comprise any of various glass or glass-ceramic materials, such as those previously been employed as substrates for magnetic recording medium. Glass-ceramic materials are typically formed by a heat treatment of the surface to form a thin crystallized layer of ceramic thereon. Some forms of conventional glass-ceramic material are referred to as "Ohara glass."

The underlayer employed in the present invention can comprise any of various materials conventionally employed as an underlayer in the production of magnetic recording media, such as Cr, CrV or CrTi. It has been found that an underlayer thickness of about 100 Å to about 2000 Å, such as about 550 Å, is suitable.

The magnetic layer of the present invention can comprise any magnetic alloy conventionally employed in the production of magnetic recording media. Such alloys include, but are not limited to, Co-based alloys such as CoCr, CoCrTa, CoNiCr, CoCrPtTa, CoCrPt, CoNiPt, CoNiCrPt and CoCrPtB. The thickness of the magnetic layer is consistent with the thickness of magnetic layers of conventional magnetic recording media. A Co-base alloy having a thickness of about 100 Å to about 1000 Å, such as about 200 Å to 500 Å, has been found suitable.

As in conventional magnetic recording media, a protective overcoat can be deposited on the magnetic layer by any conventional means, such as sputtering. Protective overcoats can comprise Zirconium oxide ($ZrO_2$), carbon, including hydrogenated carbon, silicon carbide (SiC), or a carbon nitride (CN). The protective overcoat is provided in a thickness suitable to protect the underlying layers. An overcoat having a thickness of about 50 Å to about 300 Å, such as about 100 Å to 200 Å has been found suitable.

As in conventional magnetic recording media, a layer of a lubricant can be applied on and bonded to the overcoat. The lubricant topcoat can be provided in any suitable thickness. A lubricant thickness of about 5 Å to 50 Å, such as about 10 Å to about 20 Å, has been found suitable.

The magnetic recording media produced in accordance with the present invention typically exhibit a coercivity greater than 2000 Oersteds and an Mrt of about 0.4 to about 3.0 memu/$cm^2$. The apparatus employed in the present invention can be any of those sputtering apparatus conventionally employed in the production of magnetic recording medium. In sputter depositing a partially oxidized NiP layer in accordance with the present invention, a target containing nickel with about 15 at. % to about 25 at. % of phosphorous can be employed in a chamber comprising a gas mixture of argon and about 0.1% to about 10% by volume of oxygen. The resulting partially oxidized NiP layer typically comprises nickel, about 15 at. % to about 25 at. % of phosphorous and about 0.03 at. % to about 58 at. % of oxygen. Oxides are present substantially throughout the partially oxidized NiP layer of the present invention and may comprise $PO_2$ and $PO_3$.

The present invention is not limited to the specific examples disclosed, herein or the particular materials previously exemplified or mentioned. The magnetic recording media of the present invention can comprise any of various types of glass or glass-ceramic substrates, and various types of magnetic alloy layers, including various Co-based alloy magnetic layers. The underlayer of the present magnetic recording media is not limited to Cr, but can comprise various other materials, including metals exhibiting a cubic polycrystal structure. The magnetic recording media of the present invention enjoy utility in various applications, particularly applications wherein high density is required, such as a magnetic rigid disk medium for longitudinal recording.

Only certain embodiments of the invention and but a few examples of its versatility are shown and described in the present disclosure. It is to be understood that the invention is capable of use in various other combinations and environments and is capable of changes or modifications within the scope of the inventive concept as expressed herein.

We claim:

1. A magnetic recording medium comprising:
   a substrate comprising a glass or glass-ceramic material;
   a seed layer on the substrate;
   an underlayer on the seed layer; and
   a magnetic layer on the underlayer; wherein
   the seed layer is partially oxidized substantially throughout.

2. The magnetic recording medium according to claim 1, wherein the partially oxidized seed layer is partially oxidized as deposited by reactive sputtering in an atmosphere comprising oxygen.

3. The magnetic recording medium according to claim 1, in the form of a thin film disk.

4. The magnetic recording medium according to claim 1, wherein the seed layer comprises NiP or Ta.

5. The magnetic recording medium according to claim 4, wherein the seed layer comprises NiP.

6. The magnetic recording medium according to claim 1, further comprising a protective overcoat on the magnetic layer.

7. The magnetic recording medium according to claim 6, further comprising a lubricant topcoat on the protective overcoat.

8. The magnetic recording medium according to claim 5, wherein the magnetic layer comprises a cobalt-based alloy.

9. The magnetic recording medium according to claim 8, wherein the cobalt-based alloy is selected from the group consisting of Co—Cr—Ta, Co—Cr—Pt—Ta, Co—Cr—Pt, Co—Ni—Cr, and Co—Cr—Pt—B.

10. The magnetic recording medium according to claim 8, wherein the partially oxidized NiP layer comprises Ni, about 15 at. % to about 25 at. % P, and about 0.03 at. % to about 58 at. % oxygen.

11. The magnetic recording medium according to claim 10, wherein the partially oxidized NiP layer comprises $PO_2$ and $PO_3$.

12. The magnetic recording medium according to claim 11, wherein the thickness of the seed layer is about 100 Å to about 2000 Å; the thickness of the underlayer is about 100 Å to about 2000 Å, and the thickness of the magnetic layer is about 100 Å to about 1000 Å.

13. The magnetic recording medium according to claim 1, wherein the underlayer comprises Cr or a Cr-alloy.

14. The magnetic recording medium according to claim 13, wherein the Cr-alloy comprises Cr and V or Ti.

15. The magnetic recording medium according to claim 1, which has a coercivity greater than about 2000 Oersteds, and an Mrt of about 0.4 to about 3.0 memu/$cm^2$.

16. The magnetic recording medium according to claim 1, wherein the magnetic layer has a ($11\bar{2}0$)-dominant crystallographic orientation.

17. The magnetic recording medium according to claim 16, wherein the underlayer has a (200)-dominant crystallographic orientation.

18. The magnetic recording medium according to claim 1, wherein the magnetic layer comprises a cobalt alloy and the ratio of the number of cobalt alloy grains exhibiting a ($11\bar{2}0$) crystallographic orientation to the number of cobalt alloy grains exhibiting ($10\bar{1}1$) and ($10\bar{1}0$) crystallographic orientations is greater than 7.

19. The magnetic recording medium according to claim 17, wherein the underlayer comprises chromium and the ratio of the number of chromium grains exhibiting a (200) crystallographic orientation to the number of chromium grains exhibiting a (110) crystallographic orientation is greater than 7.

20. A method of manufacturing a magnetic recording medium, which method comprises:
   depositing a partially oxidized seed layer on a substrate comprising a glass or glass-ceramic material;

depositing an underlayer on the partially oxidized seed layer; and depositing a magnetic layer on the underlayer.

21. The method according to claim 20, wherein the magnetic recording medium is in the form of a thin film disk.

22. The method according to claim 20, further comprising depositing a protective overcoat on the magnetic layer.

23. The method according to claim 22, further comprising depositing a lubricant topcoat on the magnetic layer.

24. The method according to claim 20, comprising depositing a partially oxidized seed layer containing NiP or Ta.

25. The method according to claim 24, comprising depositing a partially oxidized seed layer containing NiP.

26. The method according to claim 25, comprising sputter depositing the partially oxidized NiP seed layer in an atmosphere containing oxygen.

27. The method according to claim 26, wherein the atmosphere further comprises an inert gas.

28. The method according to claim 27, comprising sputter depositing the partially oxidized NiP seed layer employing an NiP target containing about 15 at. % to about 25 at. % P in a gas mixture comprising argon and about 0.1% to about 10% by volume of oxygen.

29. The method according to claim 26, comprising sputter depositing an underlayer containing Cr or a Cr-alloy.

30. The method according to claim 29, wherein the Cr-alloy contains Cr and V or Ti.

31. The method according to claim 26, comprising sputter depositing a magnetic layer containing a Co-based alloy selected from the group consisting of Co—Cr—Ta, Co—Cr—Pt—Ta, Co—Cr—Pt, Co—Ni—Cr, and Co—Cr—Pt—B.

32. The method according to claim 20, wherein the deposited magnetic layer is a Co-based alloy and has a $(11\bar{2}0)$-dominant crystallographic orientation.

33. The method according to claim 32, wherein the underlayer exhibits a cubic structure and a (200)-dominant crystallographic orientation.

34. The method according to claim 20, wherein the magnetic layer comprises a cobalt alloy and the ratio of the number of cobalt alloy grains exhibiting a $(11\bar{2}0)$ crystallographic orientation to the number of cobalt alloy grains exhibiting $(10\bar{1}1)$ and $(10\bar{1}0)$ crystallographic orientations is greater than 7.

35. The method according to claim 33, wherein the underlayer comprises chromium and the ratio of the number of chromium grains exhibiting a (200) crystallographic orientation to the number of chromium grains exhibiting a (110) crystallographic orientation is greater than 7.

36. The method according to claim 26, wherein substantially the seed layer is partially oxidized substantially throughout.

* * * * *